United States Patent [19]

Wang

[11] Patent Number: 4,895,042

[45] Date of Patent: Jan. 23, 1990

[54] PUMP LEVER FOR A JACK

[76] Inventor: Akie Wang, No. 77, 3-1 Fl., Chung-San Rd., Chiayi City, Taiwan

[21] Appl. No.: 245,442

[22] Filed: Sep. 16, 1988

[51] Int. Cl.⁴ .............................................. F16H 21/44

[52] U.S. Cl. ........................................ 74/519; 74/523; 267/155; 60/477; 16/305; 16/306; 254/DIG. 3; 254/813; 254/8 B

[58] Field of Search ...................... 74/519, 141.5, 523, 74/524; 267/155, 275; 60/477, 479; 403/120, 146; 16/289, 305, 306, 307; 294/8 B, DIG. 3, 93 H

[56] References Cited

U.S. PATENT DOCUMENTS

| | | | |
|---|---|---|---|
| 2,235,984 | 3/1941 | Devereaux | 16/306 |
| 2,538,372 | 1/1951 | Light | 16/305 |
| 3,701,211 | 10/1972 | Best | 60/477 |
| 3,907,252 | 9/1975 | Gaarder | 254/8 B |
| 4,307,626 | 12/1981 | Sanada | 403/120 |
| 4,635,902 | 1/1987 | Chou | 254/8 B |
| 4,656,879 | 4/1987 | Jen | 254/93 H |

FOREIGN PATENT DOCUMENTS

| | | | |
|---|---|---|---|
| 897482 | 3/1945 | France | 74/519 |
| 916243 | 11/1946 | France | 403/120 |
| 772672 | 4/1957 | United Kingdom | 403/120 |

*Primary Examiner*—Gary L. Smith
*Assistant Examiner*—F. Saether
*Attorney, Agent, or Firm*—Harness, Dickey & Pierce

[57] ABSTRACT

A pump lever for a jack is disclosed which comprises a protrusion formed near a plunger of a fluid pump for the jack; a handle sleeve having a first end and a second end, the first end being adapted to receive a handle and the second end being pivotally joined at said protrusion by a first pin, and in addition, a certain position between the first and second ends of the handle sleeve being pivotally joined with the plunger by a second pin; and a torsion spring having a pair of counteraction portions and a loop portion shaped between said pair of counteraction portions, the loop portion being passed through and supported by the first pin, and the pair of counteraction portions being adapted to respectively make contact with the protrusion and the second pin so that the torsion spring will urge the handle sleeve to raise to its uppermost position when one frees the handle, the top end of which is received in the first end of the handle sleeve at a lowered position.

4 Claims, 4 Drawing Sheets

PUMP LEVER FOR A JACK

BACKGROUND OF THE INVENTION

The present invention relates to a jack, and more particularly to a pump lever for a jack.

FIG. 1 shows a floor jack having a lifting arm A, a cylinder C for driving said lifting arm A, a hydraulic pump P for driving said cylinder C, a plunger Pl for driving said hydraulic pump P, a sleeve S pivotally joined at the top end of said plunger Pl, and a handle H, one end of which is detachably received within said sleeve S. To raise the saddle of the lifting arm to its one upper position, it is necessary for one to laboriously squat on the ground and shake the handle H up and down. In addition, it is obvious that, in performing this operation, one usually applies force not only in raising but also in lowering the handle.

In FIG. 2, a pump lever for a jack therefore provided in U.S. Pat. No. 4,656,879 is shown. This pump lever has an elastic member E mounted between the sleeve and a limiting piece L secured to a base on the jack for guiding the sleeve as it is raised and lowered, so that the sleeve can be urged to raise to its uppermost position when a user frees the handle at a lowered position. However, this type of pump lever is difficult to assemble because the elastic force applied upon the sleeve and the limiting piece L biases them away from their proper positions in which the holes S1, E1, L1 respectively formed in the sleeve, the elastic member and the limiting piece, which are prepared to be passed through and joined by a pin G, are axially aligned with each other.

SUMMARY OF THE INVENTION

It is therefore an object of the present invention to provide a pump lever for a jack which automatically urges the handle sleeve to raise to its uppermost position when a user frees it at a lowered position.

It is therefore another object of the present invention to provide a pump lever for jack which is simple in structure and easily assembled.

Accordingly, the present invention provides a pump lever for a jack comprising: a protrusion formed near a plunger of a fluid pump for said jack; a handle sleeve substantially having a first end and a second end, said first end being adapted to receive a handle and said second end being pivotally joined at said protrusion by a first pin, and in addition, a certain position between said first and second ends of said handle sleeve being pivotally joined with said plunger by a second pin; and a torsion spring having a pair of counteraction portions and a loop portion formed between said pair of counteraction portions, and loop portion being passed through and supported by said first pin and said pair of counteraction portions being adapted to respectively make contact with said protrusion and said second pin so that said torsion spring will urge said handle sleeve to raise to its uppermost position when one frees said handle, the top end of which is received in said first end of said handle sleeve at a lowered position.

BRIEF DESCRIPTION OF THE DRAWINGS

The present invention will be described in detail with reference to the accompanying drawings, in which.

DETAILED DESCRIPTION OF THE INVENTION

Figure 1:
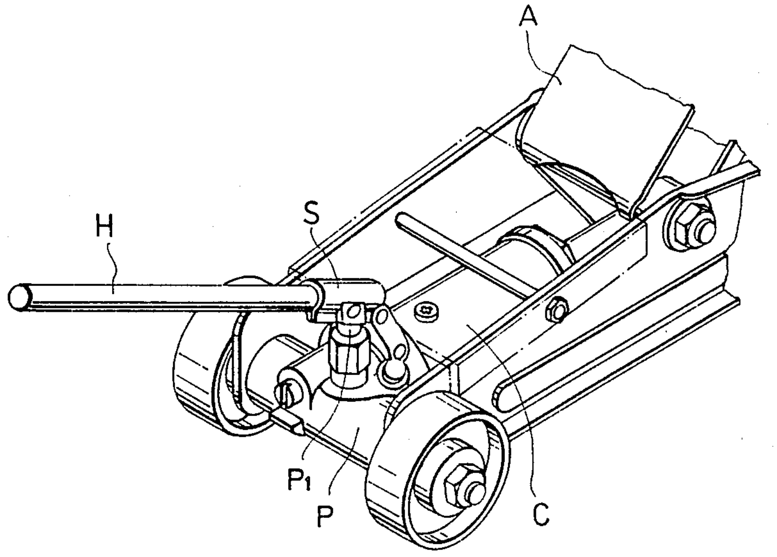
PRIOR ART FIG. 1
FIG. 1 is a perspective view of a conventional jack.
Figure 2:
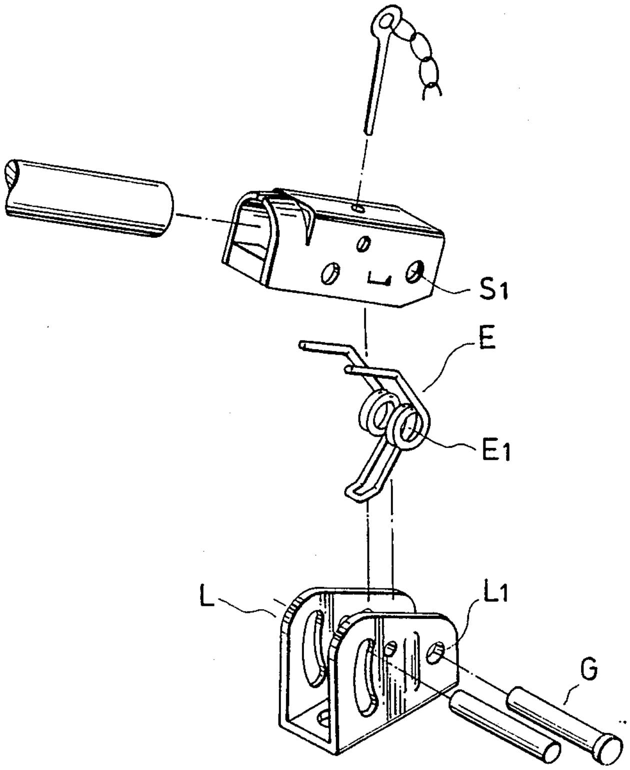
PRIOR ART FIG. 2
FIG. 2 is a perspective view of a conventional pump lever for a jack disclosed in U.S. Pat. No. 4,656,879.
Figure 3:
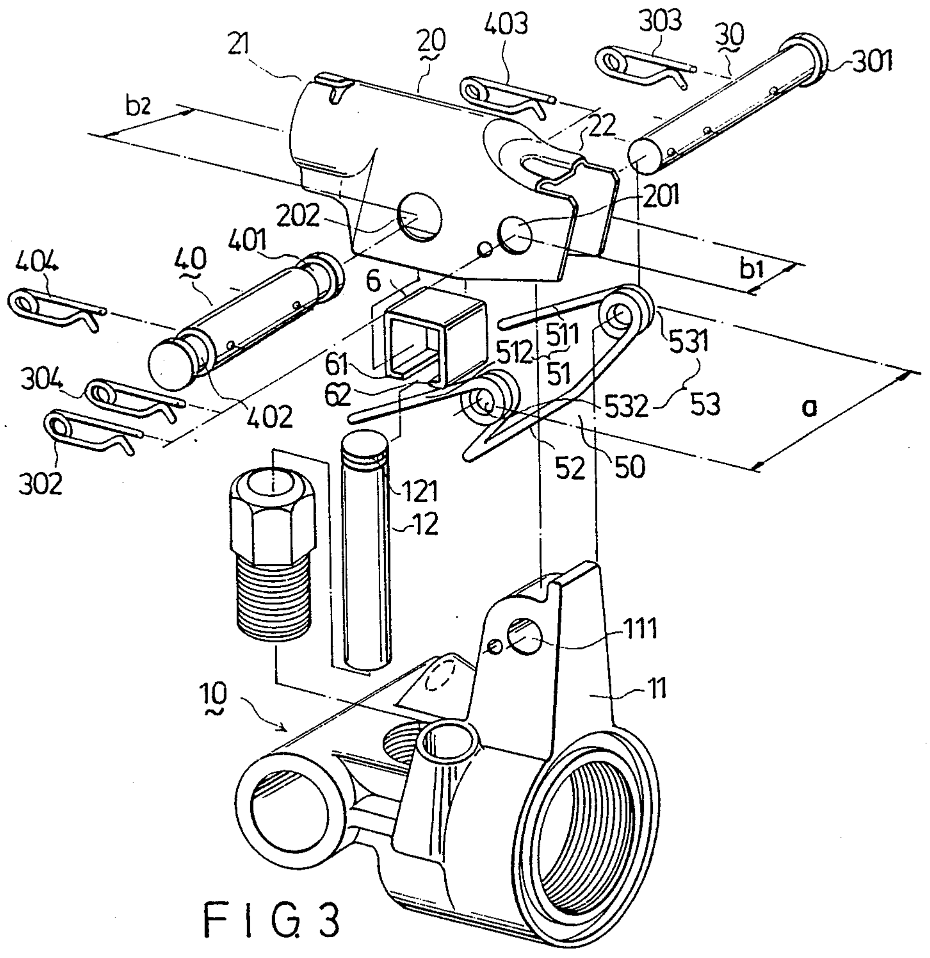
FIG. 3 is an exploded view of an embodiment according to the present invention.

Referring to FIG. 3, the present invention generally comprises: a protrusion 11 formed near a plunger 12 of a fluid pump 10 for said jack; a handle sleeve 20 substantially having a first end 21 and a second end 22, said first end 21 being adapted to receive a handle, (not shown in this figure), and said second end 22 being pivotally joined at said protrusion 11 by a first pin 30, and in addition, a certain position between said first and second ends 21, 22 of said handle sleeve 20 being pivotally joined with said plunger 12 by a second pin 40; and a torsion spring 50 having a pair of counteraction portions 51, 52 and a loop portion 53 formed between said pair of counteraction portions 51, 52, said loop portion 53 being passed through and supported by said first pin 30, and said pair of counteraction portions 51, 52 being adapted to respectively make contact with said second pin 40 and said protrusion 11 so that said torsion spring 50 will urge said handle sleeve 20 to raise to its uppermost position when one frees said handle, the top end of which is received in said first end 21 of said handle sleeve 20 at a lowered position.

Specifically speaking, said torsion spring 50 is made of a spring wire in the form of an opened loop which has: a pair of parallel sides having a pair of corresponding free ends 511, 512, forming said counteraction portion 51; a closed side 52 connected between one pair of the adjacent ends of said pair of parallel sides and forming said counteraction portion 52; and a pair of axially aligned loops 531, 532 respectively formed nearby the middle portions of said pair of parallel sides, constituting said loop portion 53.

The vertical distance a between said pair of parallel sides is larger than the pivotally axial width b1, b2 of the pivotally joined portions of said handle sleeve 20, so that said pair of axially aligned loops 531, 532 can be supported outside said handle sleeve 20 by said first pin 30, and said pair of corresponding free ends 511, 512 can be engaged with said second pin 40 outside said handle sleeve 20.

Figure 4:
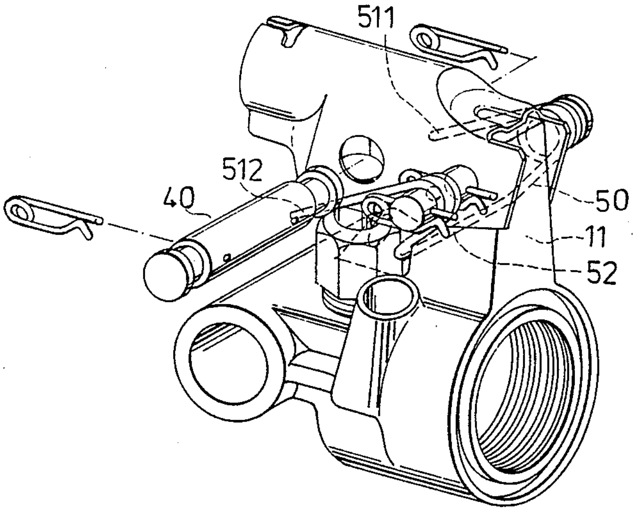
FIG. 4 is a partially exploded view of the embodiment illustrated in FIG. 3.
Figure 5:
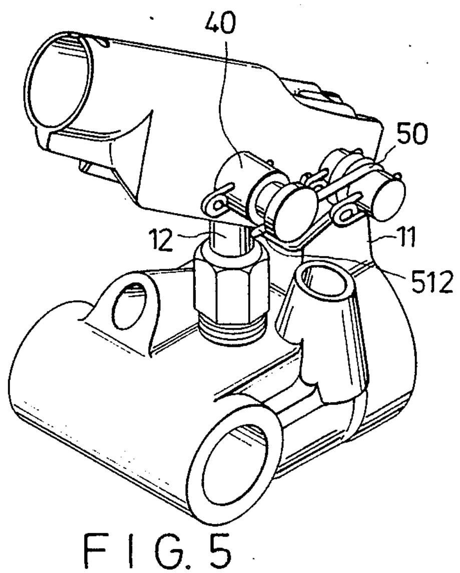
FIG. 5 is a perspective view of the embodiment illustrated in FIG. 3.

Referring to FIGS. 4 and 5, as in the assembled state, said protrusion 11 is looped by said torsion spring 50, said pair of corresponding free ends 511, 512 of which make contact with the bottom surface of said second pin 40, and said closed side 52 of which makes contact with a side of the protrusion 11 near the plunger 12.

More specifically speaking, said second pin 40 has: a pair of circumferential grooves 401, 402 respectively formed near its two ends and engaged with said pair of corresponding free ends 511, 512 of said torsion spring 50; and a pair of auxiliary pins 403, 404 respectively affixed near the two sides of the portion of said handle sleeve 20 where said second pin 40 passes through, so as to prevent said second pin 40 from detaching.

Said first pin 30 has: a radially enlarged pin head 301 and an auxiliary pin 302 respectively formed and affixed nearb its two ends so as to prevent said pair of axially aligned loops 511, 512 from detaching; and a pair of auxiliary pins 303, 304 respectively affixed near the two sides of the portion of said handle sleeve 20, at the point through which said first pin 30 passes through, so as to prevent said first pin 30 from detaching.

Said plunger 12 has a circumferential groove 121 formed near its top end, and said second pin 40 has a swing member 6 traversely and rockably looped therearound within said handle sleeve 20. Said swing member 6 has an opening with a pair of free ends 61, 62 which is slidably engaged with said circumferential groove 121 so as to form a pivotally joined structure between said plunger 12 and said handle sleeve 20.

As in the above-mentioned embodiment, according to the present invention, said pump lever for a jack can be conveniently assembled by: first, aligning said axially aligned loops 531, 532 with the holes 201 of said handle sleeve 20 for bearing said first pin 30; second, aligning said holes 201 of said handle sleeve 20 with said holes 111 of said protrusion 11 for bearing said first pin 30; third, passing said first pin 30 through the channel formed by said aligned holes 531, 201, 111, 201, 532; then, passing said second pin 40 through the holes 202 of said handle sleeve 20 for bearing both said second pin 40 and the loop of said swing member 6, simultanously setting said corresponding free ends of said torsion spring 50 under said second pin 40.

While the present invention has been described in connection with what is presently considered to be the most practical and preferred embodiment, it is to be understood that the present invention should not be limited to the disclosed embodiment, but on the contrary, be allowed to cover all the various modifications and equivalent arrangements included within the spirit and scope of the broadest interpretation.

I claim:

1. A pump lever for a jack comprising: a protrusion formed near a plunger of a fluid pump for said jack; a handle sleeve substantially having a first end and a second end, said first end being adapted to receive a handle and said second end being pivotally joined at said protrusion by a first pin, and in addition, a certain position between said first and second ends of said handle sleeve being pivotally joined with said plunger by a second pin; and a torsion spring having two pairs of counteraction portions and two loop portions formed between said pairs of counteraction portions, said torsion spring being made of a spring wire in the form of an opened loop which has a pair of parallel sides having a pair of corresponding free ends, forming one of said pair of counteraction portions, a closed side connected between said pair of parallel sides and forming the other of said pair of counteraction portions, and a pair of axially aligned loops respectively formed nearby the middle portions of said pair of parallel sides, constituting said loop portions, said loop portions being passed through and supported by said first pin, said protrusion being looped by said closed side of said torsion spring and said pair of corresponding free ends of which make contact with the bottom surface of said second pin, and said closed side of which makes contact with a side of said protrusion near the plunger so that said torsion spring will urge said handle sleeve to raise to its uppermost position when one frees said handle, the top end of which is received in said first end of said handle sleeve at a lowered position, the horizontal distance between said pair of parallel sides being larger than the pivotally axial width of the pivotally joined portions of said handle sleeve and said protrusion, so that said pair of axially aligned loops can be supported outside said handle sleeve by said first pin, and said pair of corresponding free ends can be engaged with said second pin outside said handle sleeve.

2. A pump lever for a jack as claimed in claim 1, wherein said second pin has: a pair of circumferential grooves respectively formed near its two ends and engaged with said pair of corresponding free ends of said torsion spring; and a pair of auxiliary pins respectively affixed near the two sides of the portion of said handle sleeve where said second pin passes through, so as to prevent said second pin from detaching.

3. A pump lever for a jack as claimed in claim 2, wherein said first pin has: a radially enlarged pin head and an auxiliary pins respectively formed and affixed near its two ends so as to prevent said pair of axially aligned loops from detaching; and another pair of auxiiary pins respectively affixed near the two sides of the portion of said handle sleeve, at the point through which said first pin passes through, so as to prevent said first pin from detaching.

4. A pump lever for a jack as claimed in claim 3, wherein said plunger has a circumferential groove formed near its top end, and said second pin has a swing member traversely and rockably looped therearound within said handle sleeve, said swing member having an opening with a pair of free ends which is slidably engaged with said circumferential groove formed on said plunger, so as to create a pivotally joined structure between said plunger and said handle sleeve.

* * * * *